Patented June 26, 1945

2,379,245

UNITED STATES PATENT OFFICE 2,379,245

SEMIFLUID CHASSIS OR TRACK ROLLER LUBRICANT

Arnold J. Morway, Clark Township, Union County, and John C. Zimmer, Union, N. J., assignors to Standard Oil Development Company, a corporation of Delaware No Drawing. Application July 5, 1941, Serial No. 401,264

4 Claims. (Cl. 252—35)

The present invention is concerned with the production of improved lubricating grease compositions. The invention more particularly relates to a semi-fluid grease composition which is particularly adapted for chassis and track roller lubricants. Our preferred composition comprises a mineral oil base and relatively small quantities of aluminum naphthenate and calcium naphthenate present in critical proportions.

It is known in the art to prepare various lubricating grease compositions adapted for certain uses. These uses differ considerably and one type of lubricant may not and generally is not at all satisfactory when employed for one particular type of lubricating job when it has been prepared for another type. For example, many types of semi-fluid lubricants have been prepared which are designated to lubricate chassis and track roller equipment.

It has also been known in the past to prepare lubricants containing aluminum naphthenate dispersed in mineral oil. These products are good lubricants, but they are very rubbery and cohesive in structure and are unsuited for modern automotive chassis or for the track rollers on modern crawler tractors. The use of calcium naphthenate in mineral oil has also been known. However, this metal naphthenate, when used alone in mineral oil, has no effect on the oil structure other than possibly a very slight increase in viscosity. Our invention utilizes the combined effect of both of these naphthenates in mineral oil resulting in a product which is of grease-like nature, and by the utilization of minor portions of calcium naphthenate, the ropey, rubbery cohesive nature of the aluminum naphthenate mineral oil blends may be controlled to the desired structure and consistency from heavy fluid adhesive products to semi-solid very adhesive tacky products.

Lubrication of track rollers is necessary to prevent entrance of dirt and water from the outside and to reduce friction in the bearings themselves. As tractors often work in bad mud and water conditions where track rollers are submerged, the lubricant must act as an excellent sealing medium as well as lubricant. The lubricant is forced under pressure into the track roller thru a hollow shaft. The lubricant flows into a central recess and from there feeds onto the bearing. Sufficient lubricant is forced into the track roller so that some of the old lubricant is pushed out at the edges, carrying dirt and dust away with it. For this reason the lubricant should not be cohesive with the tendency to ball up, pulling dirt away from the outside and into the bearing. It should also have sufficient body so that it will not leak from the roller thru the seals, particularly when working side hill terrain. Therefore, from this, it is obvious that a lubricant containing a controlled cohesiveness in its structure will prevent leakage thru the seals, but by controlling this cohesiveness, balling up of the lubricant with resultant pulling in of dirt into the bearing will be prevented. If the lubricant should not be retained in the track roller under these conditions, failure of the equipment will result.

Another desirable feature is the dispensing of the lubricant. The usual dispensing equipment consists of a volume pressure gun, the pump of which is fed by gravity flow of the grease. If the lubricant does not possess sufficient flow to the pump opening, the lubricant will be found impossible to dispense.

It has been also proposed in the art to employ numerous mixtures of fatty acid salts such as calcium and aluminum stearate in conjunction with a base lubricating oil (i. e. U. S. Patent 2,209,500). However, these compositions heretofore prepared are not particularly desirable since in the past the mixture of aluminum and calcium stearate has been used to prepare solid gels with the desire to prevent the natural tendency of the calcium soap from affecting the gelling of the aluminum soap. In this type mixture of aluminum and calcium soaps, the calcium soap must be dispersed into the oil with water which acts as an emulsified or dispersing medium. As soon as this water is removed, due to high temperature or other reasons, these greases separate into a soap residue and thin oil. We have, however, now discovered that by providing critical quantities of calcium naphthenate and aluminum naphthenate employed in conjunction with a lubricating oil base, a very desirable stringy semi-fluid lubricating grease composition is secured. The lubricating grease composition which we prepare in this manner is substantially free from water or anhydrous and is particularly desirable as a lubricant on track rollers, automotive chassis and the like, will not break down in service, and will be retained due to its adhesive body on the member to be lubricated.

In the manufacture of aluminum greases according to known practice, it is necessary to be particularly careful in the manner in which these lubricants are cooled previous to packaging. Generally it is necessary to either pan cool, i. e. drawing the grease into shallow pans, allowing to cool and then reworking cold, previous to packaging; or to allow the lubricant to cool and set up in the kettle without agitation. This entails a large amount of extra work and considerable time loss. This pan cooling or kettle cooling is necessary to obtain the proper consistency and structure.

In the lubricant described in this invention, the lubricant containing aluminum and calcium naphthenates may be drawn at maximum preparation temperatures directly into containers, without loss of time or the tying up of equipment, with resultant excellent structure and consistency control as long as the formulation is carefully adhered to.

Another improvement over the older type of aluminum greases, is that no particularly complicated apparatus or cooling kettles are needed in its manufacture, the requisites being a means for agitation and a kettle or container in which the lubricant may be heated to approximately 280° F. (of course, this assumes that the anhydrous aluminum and calcium soap concentrates have been previously prepared).

Our invention essentially comprises employing a mixture of naphthenic acid soaps in conjunction with a base lubricating oil.

Other types of aluminum or calcium soaps are not desirable due to the gelling effect of other aluminum soaps and the insolubility of other types of calcium soaps in oils.

Although a wide range of base lubricating oils may be employed, in general the base oil comprises an oil having a viscosity in the range of from about 50 seconds to 300 seconds S. U. V. at 210° F. and a cold test below 35° F.

We have found that preferred results are secured when employing the aluminum and calcium soaps of naphthenic acids. We have also discovered that the preferred naphthenic soaps of these metals are those which are prepared by combining aluminum and calcium with naphthenic acids obtained from distillate or residual petroleum fractions. These naphthenic acids will have a molecular weight ranging from about 150 to 320.

The concentration of the respective naphthenic soaps may vary considerably depending upon the particular base oil employed and the naphthenic acid used in forming the respective soaps, but, in general, we have found that it is preferred to employ from about 5.0 to about 12% of the combined soaps. For example, when utilizing an aluminum naphthenate in conjunction with calcium naphthenate, we prefer to use from 0.25% to 2.0% calcium naphthenate and to use in conjunction therewith at least 2½ times this concentration of aluminum naphthenate.

In order to obtain a grease of given consistency, oils of different viscosities may be used together with naphthenic acid soaps of different molecular weights. Where a light oil and high molecular weight soaps have been compounded to attain a grease of given consistency, a grease of similar consistency may be secured by the use of a higher viscosity oil together with less of the same molecular weight soaps or by the use of the same amount of lower molecular weight soaps. That is to say, by varying either or both the viscosity of the oil and/or the molecular weight of the naphthenic acid soaps used, greases covering a wide range of consistencies may be secured.

The method of preparing our compositions may also vary considerably. However, for example, the aluminum naphthenate is prepared by a double decomposition reaction involving sodium naphthenate and aluminum sulfate. When conducting a reaction of this character, the naphthenic acid is neutralized in about four times its volume of water with a 40% solution of caustic soda and reacted with aluminum sulfate at a temperature of 175° F. The precipitated aluminum naphthenate is washed with fresh water until free from any occluded salts. The aluminum soap prepared by the above reaction is then added to a suitable mineral oil and a concentration of from about 20 to 50%, and heated to a temperature of 300° F. in order to completely dry the same. The mineral oil used may vary widely but generally it is preferred to use a naphthenic type low cold test oil of approximately 170 seconds at 210° F. for the heavy grade and 85 vis. at 210° F. for the light grade. The soap may also be prepared in a dry state, however it is preferred to prepare the soaps in mineral oil concentrates to facilitate ease of handling and increase their dispensability in oil.

The calcium naphthenate may likewise be prepared by any suitable method but is preferably prepared by a direct action of hydrated lime or a similar reagent on the acid. The calcium soap is then heated to a temperature of about 300° F. in the presence of about 50% mineral oil until all evolution of moisture has ceased. The heated mixture is then cooled and filtered to remove any unreacted lime.

These two soap concentrates are then added to mineral oil of 175 seconds S.U.V. at 210° F. in the desired ratio and concentration and heated to 280° F. while stirring. On cooling a heavy viscous oil or semi-fluid grease product may be formed depending on the percentage of the soaps used and the ratio of the aluminum naphthenate to calcium naphthenate.

The following examples are given as illustrations of the invention:

*Example I*

| | Per cent |
|---|---|
| Calcium naphthenate (50% concentration in mineral oil) | 2.0 |
| Aluminum naphthenate (25% concentration in mineral oil) | 10.0 |
| Low cold test mineral oil having a viscosity of 170 seconds at 210° F. | 88.0 |

This product is a heavy fluid oil, extremely stringy and tacky and having a viscosity of about 400 seconds at 210° F.

*Example II*

| | Per cent |
|---|---|
| Calcium naphthenate (50% concentrate) | 1.0 |
| Aluminum naphthenate (25% concentrate) | 40.0 |
| Low cold test mineral oil having a viscosity of 170 seconds at 210° F. | 59.0 |

This product has a semi-fluid grease structure having an A. S. T. M. penetration of approximately 375 at 77° F.

We claim:

1. Improved anhydrous non-rubbery grease composition comprising mineral oil and from 5 to 12% of a mixture of aluminum naphthenate and calcium naphthenate in which the aluminum naphthenate is present in an amount at least 2½ times the calcium naphthenate.

2. Improved semi-fluid anhydrous non-rubbery grease composition which comprises a base lubricating oil having a viscosity in the range of from 50 to 300 seconds at 210° F. and containing from 0.25 to 2.0% calcium naphthenate and from about 5.0 to 10% aluminum naphthenate.

3. Composition as defined by claim 2 in which the concentration of the base oil is about 94.5%, the concentration of the calcium naphthenate about 0.5%, and the concentration of the aluminum naphthenate about 5.0%.

4. Composition as defined by claim 2 in which the aluminum naphthenate and the calcium naphthenate are produced from naphthenic acids having a molecular weight in the range of from 150 to 320.

ARNOLD J. MORWAY.
JOHN C. ZIMMER.